United States Patent

Niibori et al.

[11] Patent Number: 5,933,206
[45] Date of Patent: Aug. 3, 1999

[54] DISPLAY APPARATUS CHARACTERIZED BY CIRCUIT BOARD-SUPPORTING STRUCTURE

[75] Inventors: Kenji Niibori; Masanori Takahashi, both of Chigasaki; Yasushi Shioya, Atsugi, all of Japan

[73] Assignee: Canon Kabushiki Kaisha, Tokyo, Japan

[21] Appl. No.: 08/610,415

[22] Filed: Mar. 4, 1996

[30] Foreign Application Priority Data

Mar. 8, 1995 [JP] Japan ..................... 6-048700

[51] Int. Cl.⁶ ............... G02F 1/1333; G02F 1/1345; G02F 1/13
[52] U.S. Cl. ............... 349/60; 349/58; 349/149; 349/150; 349/184
[58] Field of Search ............... 349/60, 58, 149, 349/150, 184

[56] References Cited

U.S. PATENT DOCUMENTS

| | | | |
|---|---|---|---|
| 4,674,839 | 6/1987 | Tsuboyama et al. | 350/334 |
| 4,964,700 | 10/1990 | Takabayashi | 350/336 |
| 5,019,201 | 5/1991 | Yabu et al. | 156/273.9 |
| 5,150,231 | 9/1992 | Iwamoto et al. | 359/44 |
| 5,270,848 | 12/1993 | Takabayashi et al. | 359/88 |
| 5,313,318 | 5/1994 | Gruenberg et al. | 359/49 |
| 5,360,943 | 11/1994 | Mori et al. | 174/84 R |
| 5,517,208 | 5/1996 | Mori et al. | 345/87 |
| 5,583,681 | 12/1996 | Shioya et al. | 349/60 |
| 5,659,376 | 8/1997 | Uehara et al. | 349/58 |
| 5,710,607 | 1/1998 | Iwamoto et al. | 349/60 |

FOREIGN PATENT DOCUMENTS 0435343  7/1991  European Pat. Off. .

OTHER PUBLICATIONS

Patent Abstracts of Japan, vol. 013, No. 322, (P–902), Jul. 20, 1989 & JP 01 091113 A (Hitachi Ltd), Apr. 10, 1989, *abstract*.

Patent Abstracts of Japan, vol. 015, No. 020 (P–1154), Jan. 17, 1991 & JP 02 264223 A (Matsushita Electric Ind Co Ltd), Oct. 29, 1990, *abstract*.

Patent Abstracts of Japan, vol. 016, No. 123 (P–1330), Mar. 27, 1992 & JP 03 289628 A (Sharp Corp), Dec. 19, 1991, *abstract*.

Primary Examiner—William L. Sikes
Assistant Examiner—Julie Ngo
Attorney, Agent, or Firm—Fitzpatrick, Cella, Harper & Scinto

[57] ABSTRACT

A display apparatus is constituted by a display panel having an electrode terminal, a flexible carrier carrying a drive element for driving the display panel together with an input terminal and an output terminal connected thereto, a circuit board for supplying signals to the drive element, and a support plate for supporting the display panel and the circuit board. The output terminal and the input terminal of the flexible carrier are connected to the electrode terminal of the display panel and the circuit board, respectively. The support plate is provided with a supporting member, for supporting the circuit board at a position which is farther from the display panel than a line dividing the circuit board into equal halves closer to and farther from the display panel. As a result, when the display apparatus is supplied with an impact in a direction perpendicular thereto, the circuit board is allowed to rotate so as to reduce a stress applied to the flexible carrier, thereby preventing the breakage or electrical connection failure thereof.

7 Claims, 6 Drawing Sheets

DISPLAY APPARATUS CHARACTERIZED BY CIRCUIT BOARD-SUPPORTING STRUCTURE

FIELD OF THE INVENTION AND RELATED ART

The present invention relates to a display apparatus for use in a television receiver, a view finder for a video camera, a computer display, a navigation system, etc., particularly a display apparatus characterized by a supporting structure for a circuit board for driving a display panel.

Figure 8:
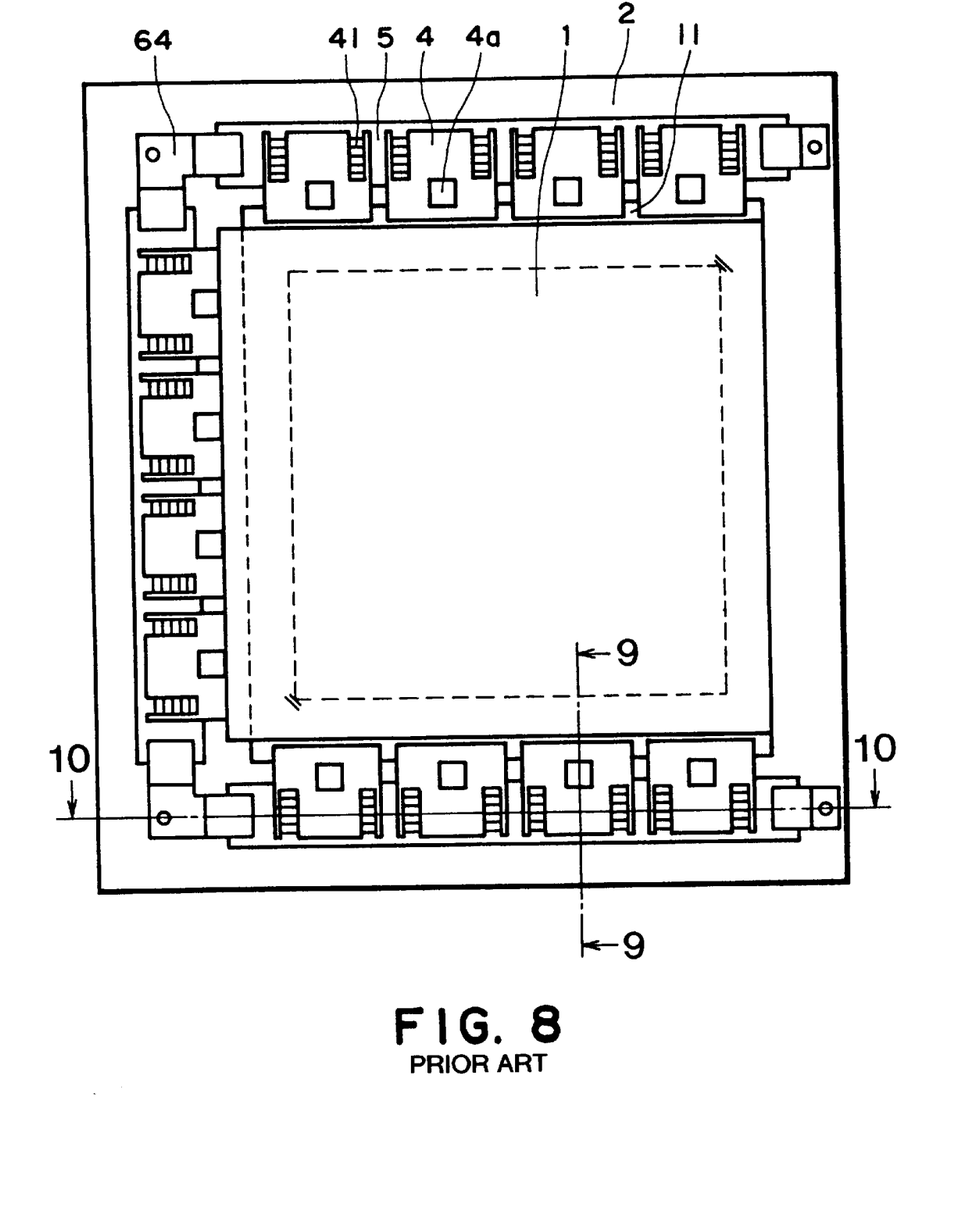
FIG. 8 is a plan view of a liquid crystal display apparatus.

A display apparatus has a planar structure, e.g., as shown in FIG. 8. A display panel 1 is constituted by disposing a liquid crystal between a pair of glass substrates each having thereon a polarizer film (not shown). A driver IC 4a for liquid crystal device is mounted on a tape carrier 4 comprising a flexible substrate by a TAB (type automated bonding) scheme. Such a package of IC is called a TCP (tape carrier package). The TCP 4 is electrically connected to a display panel 1 and a circuit board 5, which is a rigid board for supplying signals to a driver IC 4a.

Further, as shown in FIG. 8, connection electrodes 11 of the liquid crystal panel 1 are connected to output-side outer leads of the carrier 4, and input-side outer leads 41 are connected to electrodes of a circuit board 5. The circuit boards 5 are fixed to a panel-fixing plate 2 by holding plates 64.

Figure 9:
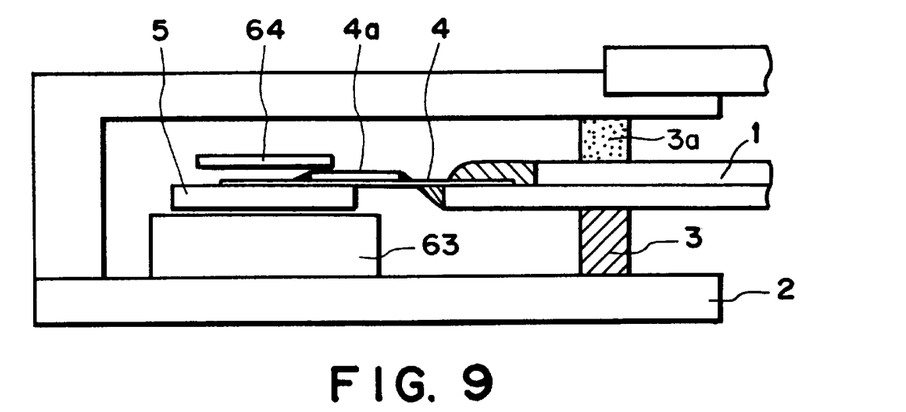
FIG. 9 is a sectional view taken along a line C—C in FIG. 8.
Figure 10:
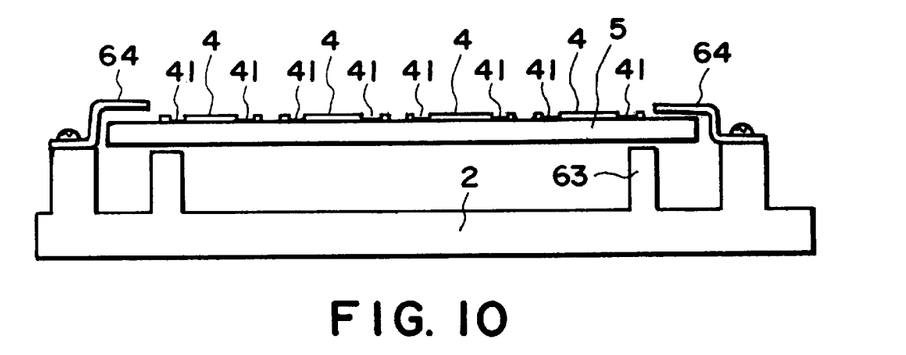
FIG. 10 is a sectional view taken along a line D—D is in FIG. 8.

FIGS. 9 and 10 are sectional views taken along a line C—C and a line D—D, respectively, in FIG. 8. An elastic member 3 formed of a cured adhesive is applied onto a periphery of the panel fixing plate 2, and a liquid crystal panel 1 is disposed thereon to be fixed by bonding. Therefore, edges of the circuit board 5 are fixed by means of the holding plate 64 onto the panel-fixing plate 2. The panel-fixing plate 2 is provided with a rib 63 for supporting the circuit board 5. An elastic member (sponge) 3a prevents dust from intruding into the display region.

A display apparatus having the above-mentioned structure is however accompanied with the following problems to be solved.

Figure 11:
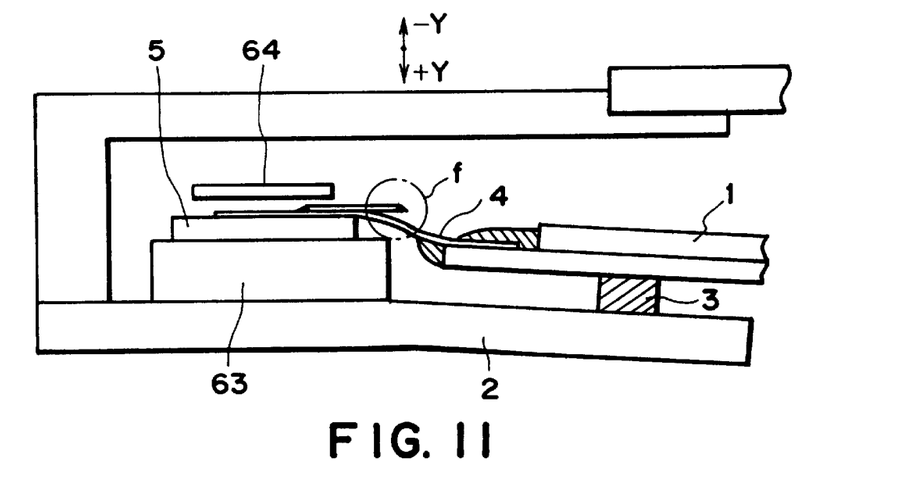
FIG. 11 is a schematic sectional view for illustrating a state when an external force is applied to the liquid crystal display apparatus shown in FIG. 8 in a +Y direction.

When an impact is applied to the display apparatus in +Y direction as shown in FIG. 11, the liquid crystal panel 1 is also caused to move in the +Y direction, so that the panel-fixing plate 2 is deformed in an arcuate form to compress the adhesive 3 as shown. Corresponding to the deformation of the panel-fixing plate 2 and the compression of the adhesive 3, a relative position between the liquid crystal panel 1 and the circuit board 5 respectively connected to the panel-fixing plate 2 is changed. The flexible substrate 4 of the TCP tends to deform to absorb the positional change but can be broken in some cases as shown at f in FIG. 11 because of a large positional change.

Further, due to an impact or vibration, the circuit board per se can be deformed to apply a stress to the TCP to cause a breakage thereof.

SUMMARY OF THE INVENTION

An object of the present invention is to provide a display apparatus provided with a circuit board-supporting structure not liable to break a tape carrier package (TCP) due to an impact or vibration applied thereto.

According to the present invention, there is provided a display apparatus, comprising: a display panel having an electrode terminal, a flexible carrier carrying a drive element for driving the display panel together with an input terminal and an output terminal connected thereto, a circuit board for supplying signals to the drive element, and a support plate for supporting the display panel and the circuit board, the output terminal and the input terminal of the flexible carrier being connected to the electrode terminal of the display panel and the circuit board, respectively;

wherein the support plate is provided with a supporting member for supporting the circuit board at a position which is farther from the display panel than a line dividing the circuit board into equal halves closer to and farther from the display panel.

In this instance, the supporting member may preferably be provided as at least three projections which may be disposed between adjacent flexible carriers or directly below the input terminal of a flexible carrier.

Further, in the present invention, it is appropriate to provide a regulation member for regulating the movement of the circuit board at a position opposite to the supporting member via the circuit board. The regulation member may preferably be provided to a housing member disposed above the display panel. The regulation member may preferably be composed of an elastic member.

Further, a slight gap may be provided between the circuit board and the regulation member.

The display apparatus according to the present invention may preferably be constituted as a liquid crystal display apparatus.

According to the present invention, there is provided a display apparatus having a high reliability wherein the circuit board is inclined when a strong impact or vibration is applied to the display panel, thereby preventing a breakage of TCP or a separation of an electrical connection.

These and other objects, features and advantages of the present invention will become more apparent upon a consideration of the following description of the preferred embodiments of the present invention taken in conjunction with the accompanying drawings, wherein like parts are denoted by like reference numerals.

DESCRIPTION OF THE PREFERRED EMBODIMENTS

Figure 1:
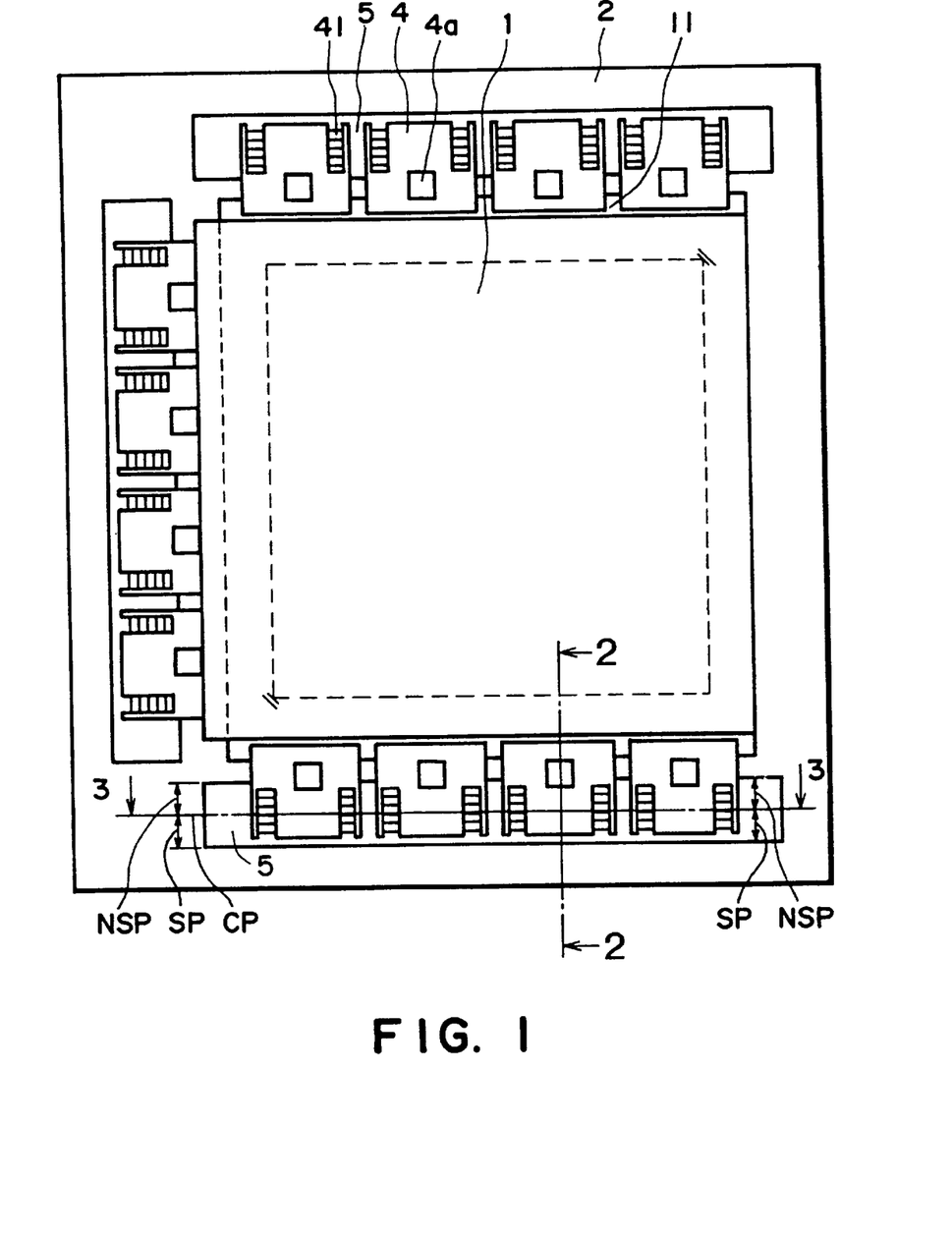
FIG. 1 is a plan view of a liquid crystal display apparatus according to an embodiment of the invention.

Referring to FIG. 1, a display panel 1 is constituted by disposing a liquid crystal between a pair of substrates, e.g., composed of glass, each having on their inner sides contacting the liquid crystal a group of electrodes and having on their outer sides polarizer films (not shown). Driver ICs 4a for driving the display panel are mounted on flexible tape carriers 4 and electrically connected to the display panel 1 and the circuit board 5, which is a rigid board for supplying electric signals, such as a reference voltage, clock signals, image signals and control signals to the driver ICs 4a.

Connection electrodes 11 of the display panel 1 are connected to output-side outer leads (output terminals) of the carrier 4, and input-side outer leads (input terminals) 41 are connected to the electrodes of the circuit board 5. In the embodiment shown in FIG. 1, the holding plates 64 used in the device of FIGS. 9 to 11 are not used.

Some characteristic features of this embodiment are described with reference to FIG. 2 which is a sectional view taken along a line A—A in FIG. 1, and FIG. 3 which is a corresponding view showing a state further covered with a face plate-supporting member 10.

Figure 2:
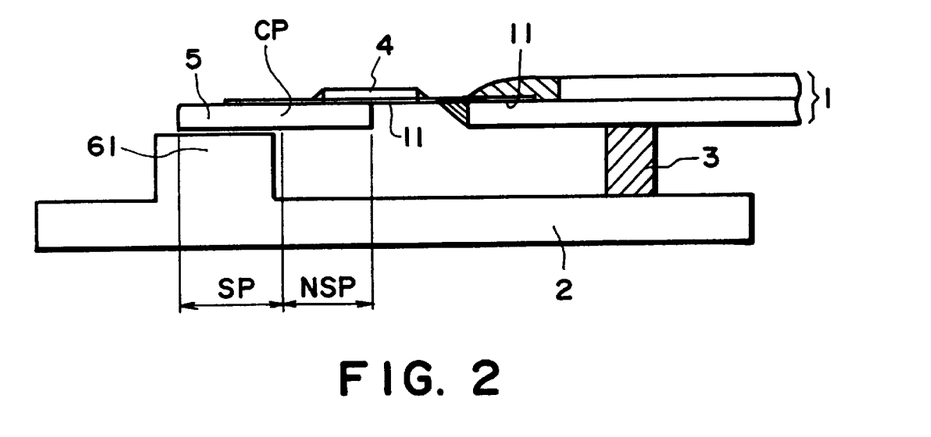
FIG. 2 is a sectional view taken along a line A—A in FIG. 1.

Referring to FIG. 2, a display panel 1 is disposed on an elastic member 3, formed of a (cured) elastic adhesive, which in turn is disposed on an upper surface of a panel-fixing plate 2. The elastic member 3 is fixedly disposed on the panel-fixing plate 2 (as a support plate) so as to surround the four sides of a display area of the panel 1. The fixing structure may be formed by applying an elastic adhesive which shows elasticity after the curing in a frame-shape and disposing thereon the display panel 1, followed by curing of the adhesive. Further, the panel-fixing plate 2 is provided with a supporting member 61 in the form of a rib as a supporting member in the present invention at such a position as to support a circuit board disposed thereon with (a portion of) a half region SP thereof disposed farther from the panel 1 with respect to a line CP extending in a direction of arrangement of electrode terminals of the display panel 1 and dividing the circuit board 5 into equal halves (SP and NSP). The remaining half region NSP of the circuit board 5 is provided with no supporting member.

Figure 3:
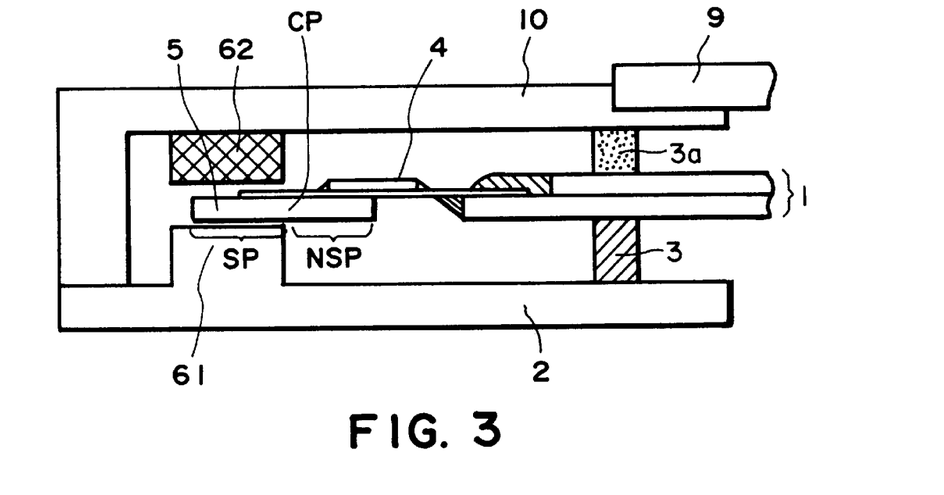
FIG. 3 is also a sectional view taken along a line A—A in FIG. 1 including members not shown in FIG. 1.

Further, as shown in FIG. 3, a face plate 9 is disposed above the display panel 1. The face plate 9 is fixed to a face plate-supporting member 10, which in turn is fixed to the panel-fixing plate 2. The face plate-supporting member 10 is provided with an elastic member 62 (as a regulation member of the present invention) at a position corresponding to the region SP of the circuit board 5 which is disposed farther from the panel 1 with respect to the above-mentioned line CP dividing the circuit board 5 into equal halves in a direction parallel to the direction of arrangement of the electrode terminals of the display panel 1. The elastic member 62 is disposed above and with a gap from the circuit board 5 so as to regulate or restrict an upward movement of the circuit board 5.

Figure 4:
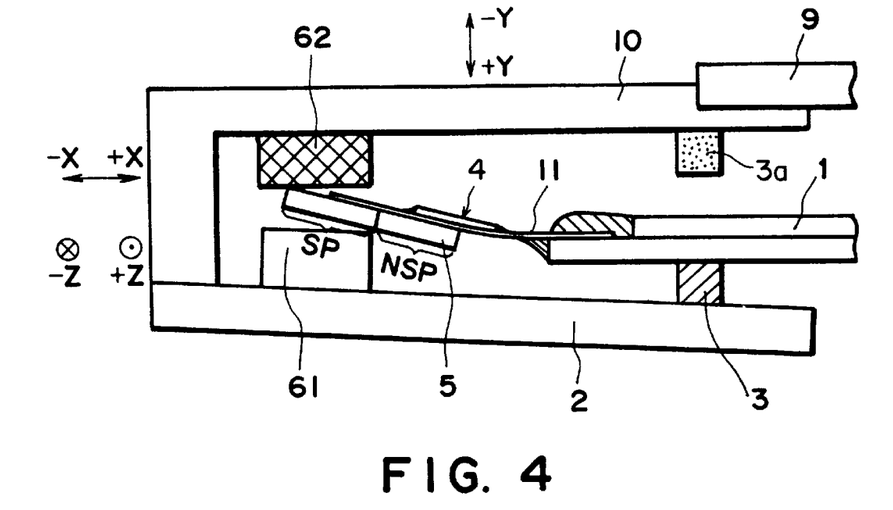
FIG. 4 is a sectional illustration for illustrating a state when an impact is applied in a +Y direction to the liquid crystal display apparatus.

Same effects of the above-described arrangement will now be described with reference to FIGS. 4 and 5. For example, when a dropping impact is applied in a +Y direction to the display apparatus, the display panel 1 is supplied with a load to move in the +Y direction and simultaneously the panel-fixing plate 2 is deformed in an arcuate form to compress the elastic member 3 as shown in FIG. 4.

At this time, due to the deformation of the panel-fixing plate 2 and the compression of the elastic member 3, a relative position between the display panel 1 fixed to the panel-fixing plate 2 and the circuit board 5 is changed. However, as the supporting member 61 (is supporting means) supporting the circuit board 5 is disposed in the region SP which is farther from the display panel 1 with respect to the line CP diving the circuit board 5 into equal halves in the direction of arrangement of the terminal electrodes 11 of the display panel 1, the circuit board is allowed to slidably rotate about the edge of the supporting member 61 as a fulcrum. As a result, it becomes possible to prevent the breakage of the TCP or separation of the connection.

Figure 6:
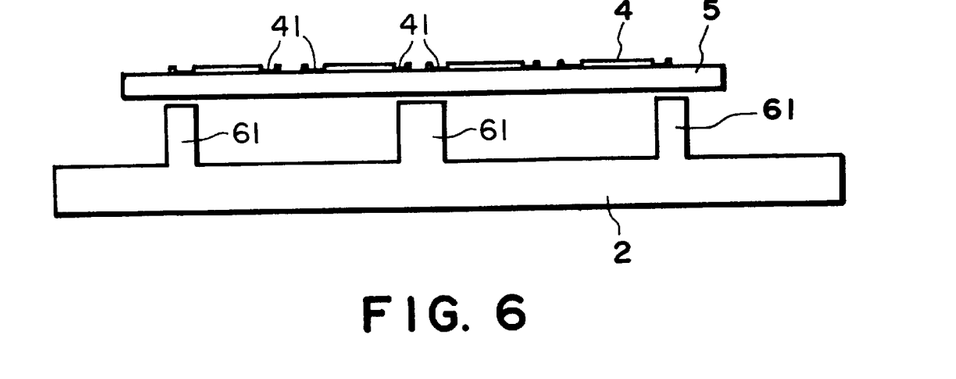
FIG. 6 is a sectional view taken along a line B—B in FIG. 1.
Figure 7:
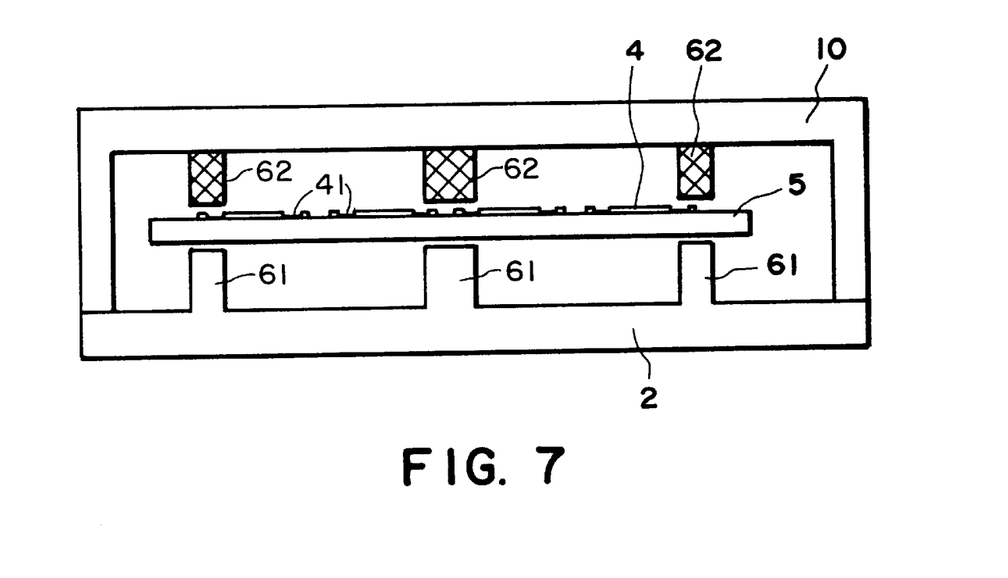
FIG. 7 is also a sectional view taken along a line B—B in FIG. 1 including members not shown in FIG. 1.

The supporting member may preferably be composed of a plurality of ribs 61 arranged discretely in the longitudinal direction of the circuit board 5. An arrangement example thereof is illustrated in FIGS. 6 and 7. Referring to these figures, a supporting member 61 as descried above is disposed not only at both ends of the circuit board 5 in the direction of arrangement of the terminal electrodes 11 (i.e., in the longitudinal direction of the circuit board 5) but also at a central position of the circuit board 5. As a result, the deformation of the circuit board in the longitudinal direction is reduced.

Figure 5:
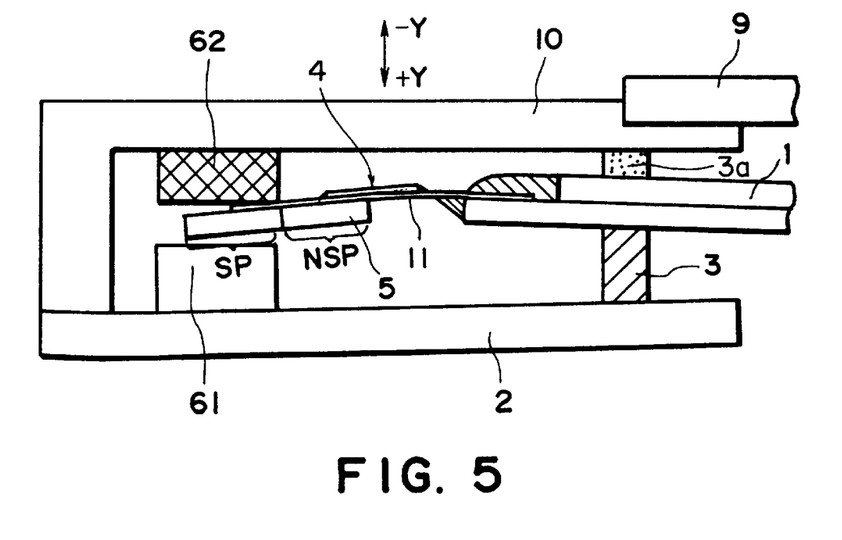
FIG. 5 is a sectional illustration for illustrating a state when an impact is applied in a −Y direction to the liquid crystal display apparatus.

Further, also in the case of a dropping impact in the −Y direction, the circuit board is allowed to rotate because of the above-mentioned specified position in the region SP of the elastic member 62, the circuit board 5 is allowed to rotate upward (counterclockwise) as shown in FIG. 5. As a result, it becomes possible to reduce a flexural deformation of the TCP per se and a stress applied thereto, thereby preventing the breakage of the TCP and the occurrence of connection failure.

Similarly as the supporting member 61, if the elastic member 62 is disposed not only at both ends but also at a central portion of the circuit board 5, it is possible to reduce the deformation of the circuit board 5 per se along the longitudinal direction thereof and minimize the stress applied to the TCP, thus effectively preventing the breakage.

Further, by disposing an elastic member 62 between an adjacent pair of TCPs 4 in a display apparatus including a plurality of TCPs disposed on a side of the display panel 1, it is possible to obviate a collision or contact between a TCP 4 and an elastic member 62, thereby avoiding an unnecessary stress applied to the TCP 4. Further, by disposing the supporting member 61 and the elastic member (regulation member) 62 directly below or above the input terminals 41 of the TCP 4, these members may be disposed without narrowing a region for mounting drive elements on the TCPs 4 and the circuit board 5. As the supporting member 61 and the regulation member 62 are disposed with a spacing which is larger than the thickness of the circuit board 5, so that a gap is ensured to remain between the circuit board 5 and one of the supporting member 61 and the regulation member 62.

As a result, the movement of the circuit board 5 is restricted in the ±Y directions than in the ±X directions and in the ±Z directions. Thus, when the panel 1 is moved in the ±X or ±Z direction due to an impact applied thereto, the circuit board 5 is also moved in the ±X or ±Z direction. However, the movement of the circuit board 5 in the ±Y direction is restricted, so that the circuit board 5 is moved in accompaniment with the display panel 1, and a relative position therebetween is not readily changed, to effectively prevent the breakage of the TCPs and the occurrence of connection failure.

The liquid crystal material used in the display panel 1 may comprise a chiral smectic liquid crystal showing ferroelectricity or anti-ferroelectricity, a nematic liquid crystal or a chiral nematic liquid crystal.

In the above embodiment, the elastic member 3 between the display panel 1 and the panel-fixing plate 2 is formed by bonding the display panel 1 and the panel-fixing plate 2 with a cured adhesive of silicone rubber-type, but the manner of production and fixation need not be limited thereto.

Further, the panel-fixing plate 2 may be replaced by a backlight unit, which may be of a direct backing-type, or a side light-type (edge light-type) using a solid light guide member, such as an acrylic, resin plate, or a hollow light guide space.

The materials including hardness of the rib 61 provided to the panel-fixing plate 2 and the regulation member (preferably an elastic member) 62 provided between the face plate-supporting number 10 and the circuit board 5, need not be particularly limited.

The face plate 9 may preferably be disposed above the display panel 1 but can be omitted.

As described above, according to the present invention, it is possible to obviate the breakage of a TCP or the occurrence of electrical connection failure thereof even when a strong impact or vibration is applied to a display apparatus. Further, by holding or supporting a circuit board with a small gap with an upper or lower supporting member, it is possible to alleviate the breakage of a TCP fixed to the circuit board or the occurrence of electrical connection failure thereof even when the display panel is moved in horizontal directions due to an impact application.

What is claimed is:

1. A display apparatus, comprising: a display panel having an electrode terminal, a plurality of flexible carriers arranged along a periphery of the display panel and each carrying a drive element for driving the display panel together with an input terminal and an output terminal connected thereto, a circuit board for supplying signals to the drive element, and a support plate for supporting the display panel and the circuit board, the output terminal and the input terminal of the flexible carrier being connected to the electrode terminal of the display panel and the circuit board, respectively;

wherein the support plate is provided with supporting means for supporting the circuit board at a position which is farther from the display panel than a line dividing the circuit board into first and second equal halves, the first half being closer to the display panel and the second half being farther from the display panel, the supporting means is disposed between adjacent ones of the plurality of flexible carriers, a regulation member for regulating a movement of the circuit board is disposed on a support member for supporting a face plate disposed above the display panel at a portion opposite to the supporting means so as to sandwich the circuit board between the face plate and the supporting means.

2. A display apparatus according to claim 1, wherein the supporting means comprises at least three projections formed on the supporting plate.

3. A display apparatus according to claim 1 or 2, wherein the supporting means is disposed directly below the input terminal of the flexible carriers.

4. A display apparatus according to claim 1, wherein at least one of the supporting means and the regulation member is composed of an elastic member.

5. A display apparatus according to claim 1, wherein a gap is formed between the circuit board and the regulation member.

6. A display apparatus according to claim 1, wherein the display panel comprises a liquid crystal panel.

7. A display apparatus according to claim 6, wherein the liquid crystal panel comprises a pair of substrates and a chiral smectic liquid crystal disposed between the substrates.

* * * * *

UNITED STATES PATENT AND TRADEMARK OFFICE
CERTIFICATE OF CORRECTION

PATENT NO.    : 5,933,206
DATED         : August 3, 1999
INVENTOR(S)   : KENJI NIIBORI ET AL.

It is certified that error appears in the above-identified patent and that said Letters Patent is hereby corrected as shown below:

COLUMN 1

Line 30, "C-C and a line D-D," should read --9-9 and a line 10-10,--.

COLUMN 2

Line 40, "A-A" should read --2-2--;
    Line 42, "A-A" should read --2-2--;
    Line 50, "B-B" should read --3-3--;
    Line 52, "B-B" should read --3-3--;
    Line 56, "C-C" should read --9-9--; and
    Line 58, "D-D" should read --10-10--.

COLUMN 3

Line 17, "A-A" should read --2-2--; and
    Line 66, "is" should read --as--.

UNITED STATES PATENT AND TRADEMARK OFFICE
CERTIFICATE OF CORRECTION

PATENT NO.    : 5,933,206

DATED         : August 3, 1999

INVENTOR(S)   : KENJI NIIBORI ET AL.

It is certified that error appears in the above-identified patent and that said Letters Patent is hereby corrected as shown below:

COLUMN 4

Line 13, "descried" should read --described--.

COLUMN 5

Line 12, "number" should read --member--.

Signed and Sealed this

Eighteenth Day of July, 2000

Attest:

Q. TODD DICKINSON

Attesting Officer

Director of Patents and Trademarks